United States Patent Office 2,809,124
Patented Oct. 8, 1957

2,809,124

PRODUCTION OF INORGANIC OXIDE COMPOSITION COATINGS

Christian E. Rick, Wilmington, Del., assignor to E. I. du Pont de Nemours and Company, Wilmington, Del., a corporation of Delaware No Drawing. Application August 26, 1954, Serial No. 452,461

5 Claims. (Cl. 117—46)

This invention relates to the production of solids and solid coatings, such as vitreous enamels, glasses and ceramics, and more particularly to multi-component oxide solids.

The field of vitreous enameling encompasses the art wherein a solid material is covered with a glass-like coating. This glass-like coating may be transparent, clear or colored, or it may be opaque, white or with many other colors and structures. The present commercial procedure for carrying out the vitreous enameling process comprises preparing a composition, the so-called frit of the industry, which is ground into a fine powder then dispersed in a liquid medium, coated on the article by dipping, painting or spraying, and then the coated article is heated to the fusion and curing temperature of the particular frit utilized. The types of vitreous enamel compositions vary widely because of the different end uses of the final products. In some cases the vitreous enamel must withstand severe chemical attack and therefore must be either quite acid or alkaline resistant, in other cases the material must resist typical outside weathering, and in some instances the vitreous enamel effect is desired only for decorative purposes and is used in applications wherein the resistance to the surrounding atmosphere is a minor item compared to the decorative effect desired.

In the preparation of the frit compositions the dried ingredients such as aluminum oxide, phosphate containing materials, boron containing materials such as borates, and alkali and alkaline earth metal salts are mixed and placed in a crucible for melting at high temperatures, that is from 1000–1300° C., for some time until they tend to become a homogeneous melt. During this melting procedure a number of reactions may occur, such as loss of moisture from some of the components, chemical decomposition of other agents, and reaction between the various materials, to form the glass-like composition desired in the final frit. After the mass has become liquid the frit is poured into water for quenching purposes. It then may be dry or wet ground for some time, usually for about ten hours, by a milling procedure such as a porcelain ball mill, after which time the material is screened through a fine mesh screen to remove the oversize material. The fluid slurry resulting from the milling procedure is then coated on the object, such as a steel panel, by spraying, dipping, or brushing. During the final heating cycle of the vitreous enamel process the frit components melt or sinter together to form the glass-like coating which includes in many cases an opacifying agent such as air bubbles, or a higher refractive index pigmenting material such as oxides of titanium, zirconium, antimony or tin.

In these prior enameling procedures, the whole article to be coated must be heated to the curing and melting temperature of the vitreous enamel utilized. This requires that the base material be stable at high temperatures and have sufficient heat resistance to allow the enamel to be cured. The equipment required for the usual enameling process is large, bulky and expensive. The total process to the finished article is thus seen to be very complex starting from many different ingredients and requiring many chemical reactions. The complete cycle for the preparation of a ceramic coating is a lengthy procedure which includes purification, grinding, milling, slurrying, mixing, shaping such as molding, drying, firing, glazing, etc.

Flame spraying of solid coatings has been proposed using oxide combinations made by mixing the required oxide ingredients as powders and feeding the powders into a powder flame-spraying burner. Preparation of the solid mixes is difficult, non-homogeneity of the final product is one draw-back which has been combated by producing the final ceramic composition in a frit composition and then grinding this finished material into a fine powder required for the flame spraying process.

The formation of multi-component oxide solid materials having special optical or electrical properties has been carried out by the Verneuil process, which produces a boule from dry powder mixes of the separate compounds usually oxides which are desired in the final oxide product.

It has also been suggested that metal and metalloid halides be hydrolyzed or oxidized to produce solid multi-component oxide compositions. This type of process has the drawback of producing hydrogen halides or free halogen as by-products from the reaction. These by-products are objectionable because of the corrosive and hazardous spraying conditions. In many cases absorbed halogen or hydrogen halide would be harmful for some of the sensitive electrical or optical products desired.

The objects of this invention are many. One object is to provide a process for vitreous enameling which does not require the many steps of the prior art processes. Another object is the preparation of a fluid composition for enameling attained by simple mixing of specified ingredients which does not require the initial high temperature treatment of prior art material. Another object is to provide an enameling process in which the final furnacing operation is not necessarily required. A further object is to provide a vitreous enameling process in which only the surface of the article to be coated is subjected to the high temperature necessary for curing the vitreous frit. Other objects of my invention are to provide an improved procees for producing multi-component oxides solids which have special optical and/or electrical properties such as high refractive index or dispersion and special ferromagnetic, ferroelectric, piezoelectric, dielectric, desirable conductivity, semi-conduction, etc., properties. Such materials to be produced in sheets, boules, crystals, or other solid masses, are another object of my process.

These and other objects are accomplished by my invention which in its broadest aspect is a process for forming an inorganic composition containing a plurality of oxides from a combustible mixture of reactive ingredients, at least one of which is a combustible organic compound of a component of the desired oxide solid which comprises preparing and feeding said ingredients to a burner, burning to oxidic compounds said organic combustibles associated with remaining ingredients with an oxygen containing gas, and impinging the hot products of combustion onto a receiving surface.

In a specific embodiment my invention comprises a process for coating a solid with an oxide composition containing a plurality of solid oxides which comprises mixing reactive ingredients at least one of which is a combustible organic compound of a glass constituent element selected from the group consisting of network formers, network modifiers, and network intermediates, the remaining ingredients being selected from the group consisting of oxygen compounds of components, hydrogen compounds of components, elemental components, and compatible combustible fuel, burning the combustible reactant with an oxygen containing gas, and impinging the hot molten products of combustion onto the surface to be coated.

The method of my invention yields a multi-component oxide solid product composition wherein a component is a metal or metalloid (non-metal) element existing as a solid oxygen compound in the final solid. Expressed in terminology used in ceramic, glass and mineral art, the product comprises $$M_1O_x \cdot M_2O_y \ldots M_nO_z$$

where $M_1, M_2 \ldots M_n$ = metal and metalloid element component
$O$ = oxygen
$x, y \ldots z$ = subscripts to denote atomic amounts of oxygen required for oxide compound This product composition is produced by oxidizing a combustible reactant comprised of ingredients:

(1) At least one of which is a combustible organic compound of a component selected from the glass consituent elements which act as network formers, network intermediates, and network modifiers.

(2) The remaining ingredients being selected from the group consisting of (a) oxygen compounds of components, (b) hydrogen compounds of components, (c) elemental component, and (d) compatible combustible fuel.

The oxidizing gas may be air, oxygen enriched air or oxygen.

The following examples are ment to serve as illustrations of the method of my invention and are meant in no way in limitation thereof.

Example I

High dielectric constant barium titanate compositions, for example those disclosed in U. S. P, 2,434,079, can be produced by the method of my invention. For the preparation of a specific multioxide composition having a $TiO_2$ to barium oxide molecular ratio of 1.5, a fluid combustible reactant comprised of 56 parts by weight of anhydrous barium hydrate and 310 parts by weight of 2-ethyl-hexyl titanate is prepared. This fluid mixture is fed to a burner nozzle where it is burned and oxidized using an excess of oxygen. The combustion products are coated on sheet metal by moving the burner over the sheet and allowing the products of combustion to impinge onto the sheet. A solid lump is produced by allowing the oxidation products to impinge on the same area until the surface is built-up by a number of layer coatings. This type of material has high dielectric constant. The composition of the product may be changed by varying the relative amounts of reactants in the combustible fluid utilized, that is the amount of anhydrous barium hydrate in relation to the organic titanate.

Example II

For the preparation of a vitreous enameling composition the following elements are utilized, as network formers—boron and silicon, as network modifiers—lithium, sodium, potassium and barium, and as network intermediates—aluminum, titanium, and zirconium. The combustible reactant is prepared by mixing the following parts by weight; triethylborate 37.9, tetraethyl silicate 50, lithium ethylate 7.6, sodium ethylate 17.7, potassium ethylate 14.8, barium ethylate 63.0, triethylaluminate 6.2, tetraethyl titanate 7.3, and tetraethyl zirconate 2.7. The combustible organic esters are combined with absolute ethyl alcohol to produce the mixture for oxidation to the multi-oxide enamel composition. The liquid mixture is fed to the burner nozzle, united with air and ignited to produce a flame in which reactions proceed to produce the vitreous enamel composition. The molten product of combustion, at a temperature above 600° C. which is about the melting point of the multi-oxide product, are impinged upon the metal surface to produce a vitrified coating. The thickness of the coating and its opacity is controlled by the resident time of the burner over the area in question together with the amount of mixture being burned. Adjustment of the combustible to air ratio effects the appearance of the coating because of the reducible character of the titanium opacifier.

Example III

Alkaline earth stannates are useful dielectric compositions which may be prepared by a method of my invention. The combustible reactant is prepared using organic esters, in particular the ethylates, of calcium, strontium, zinc and tin, containing the equivalent of 15.3% calcium oxide, 28.4% strontium oxide, 1% zinc oxide, and 55.2% stannic oxide. The combustible mixture is fed to a burner, mixed with oxygen and burned using an excess of oxygen to produce a dielectric coating which has a positive temperature coefficient of dielectric constant.

The method of my invention may be utilized to produce coatings which serve a decorative purpose, that is clear, opaque, crazed, colored, etc. Utilitarian coatings such as protective enamels for metals with either a clear glassy or opaque finish may also be produced. Coatings or solids having special electrical properties such as insulating properties, high dielectric constant, semiconducting properties, high conducting films, ferroelectric properties, piezoelectric properties, etc. are contemplated. Coatings, solids, and films having special optical properties also may be produced in particular those having photosensitivity, or low or high refractive index or dispersion. Adjustment in the amount of flame impingement and contact with the surface coating permits variation in the character of the coatings.

When the coating process is continued within a limited area, the product can be built up into solid forms, such as lumps, or for the preparation of synthetic minerals or jewels in the form of boules or single crystals allowing the formation of gems, optical or electrical special property crystals, and other uses. The coating composition may also be spread over the desired area with a thicker coating than is required for a vitreous enamel to obtain sheet-like solid materials or the velocity of the flame may be regulated together with cooling fluids to produce fiber-like materials. The repair or patching of worn or broken enamel surfaces is also contemplated. The products after flame spraying may be heat treated to develop special properties such as heating in an oxygen atmosphere to improve color or insure highest state of oxidation, or simple heat treatment to relieve stresses, etc.

In adapting my invention to the production of boules or single crystals of crystalline oxide compositions the basic apparatus of Verneuil is utilized. The powdered oxide dispensing system is discarded and the burner is fed with oxygen and the combustible reactant. As an example, a combustible mixture of ethyl zirconate and ethyl silicate, having an atomic ratio of Zr/Si of 1/1 is burned to produce zircon (zirconium silicate). The molten oxide product is impinged downwardly upon a support held within a heat retention zone. As the product is building up on the support, the support and product are gradually withdrawn downwardly into a cooler zone to promote crystallization of the product. Adjustment of the flame impingement on the surface and the rate of withdrawal help to control the cooling and crystallization.

A number of the multi-oxide compositions have superior heat resisting properties and therefore have utility as refractories. Aluminum and silicon oxides, zirconium and silicon oxides, and alkaline earth zirconates and aluminates are examples of such compositions. The heat conducting properties of coatings or solid forms of such refractory compositions produced by the method of my invention may be varied by controlling the temperature of deposition. When the multi-component oxide is deposited in the molten state with the flame impinging on the supporting surface, a dense and therefore higher heat conducting product is formed. When the oxide is deposited at temperatures below the melting point of the solid product, by such means as reducing the amount of heat produced or moving the burner away from the supporting surface, the product is less dense, having a structure similar to sintered particles with voids, and therefore lower heat conductivity is obtained.

The solid multi-component oxide compositions, especially those related to glass-like materials, resulting from the method of my invention contains at least two oxides of the component metal or metalloid elements selected from the group consisting of network formers, network modifiers, and network intermediates. These materials are defined in "Encyclopedia of Chemical Technology," R. E. Kirk and D. F. Othmer, vol. 7, Interscience, New York (1951), page 204. The network formers (N. W. F.) are silicon, boron, phosphorus germanium, arsenic, and antimony. The network modifiers (N. W. M.) are calcium, strontium, barium, lithium, sodium, potassium, rubidium, and cesium. The network intermediates (N. W. I.) are titanium, tin, aluminum, and zirconium, usually acting as network formers; and iron, beryllium, magnesium, nickel, zinc, cobalt, existing partially in the network and partially in the holes or vacancies of the glass pseudo lattice. Lead is a network intermediate which is usually considered to serve as a network former.

The method of my invention contemplates that the organic combustible reactants are burned with an oxygen containing gas with the metal and metalloid compounds being oxidized and combined into the coating. In the combustible reactant, containing the metal and metalloid components, at least one combustible organic compound of the glass component elements selected from the group consisting of the network formers, network modifiers, and network intermediates is utilized. The combustible mixture may be formed by mixing combutible organic compounds of all of the metal and metalloid components desired in the oxide mixture but this is not a requirement. At least one ingredient must be a combustible organic compound of an element selected from the above group, but the remainder of the ingredients may be selected from the group which consists of oxygen compounds of components, hydrogen compounds of components, elemental component, and combustible fuel which may act as a solvent or liquid carrier of the active ingredients. The combustible fluid fuel may be an anhydrous liquid organic combustible, such as a hydrocarbon, alcohol, ether, ketone, etc., or it may be gaseous organic compound, carbon monoxide, or hydrogen. The oxygen containing gas may be pure oxygen, oxygen enriched air, or air with the selection of the gas to be utilized depending upon the temperature desired and required for reaction and melting or fritting of the coating or solid form. A wide range of temperature is obtainable by selection of the organic combustibles and the amount and concentration of oxygen-containing gas. The atmosphere during deposition of the products of oxidation reaction may be controlled on the oxidizing, neutral, or reducing side by regulating the ratio between the fuel components and the oxygen-containing gas. This permits the formation of oxide compositions having special properties, for instance reducing conditions with titanates produce greater electrical conductivity and oxidizing conditions promotes dielectric properties by hindering decomposition to lower oxides.

Oxidizing conditions exist when there is oxygen in excess of that required to convert the organic reactants and fuel to the fully oxidized states ($CO_2$ and $H_2O$) and reducing conditions when the products of combustion contain carbon monoxide.

The combustible organic compound ingredient of the metals and metalloids (non-metals) are selected from the group consisting of organic esters $\left[M(OR)_x\right]$, organic acid compounds $\left[\text{acylates, } M\left(O-\overset{O}{\underset{\|}{C}}-R\right)_x\right]$, organo-compounds $\left[M(R)_x\right]$ and polymers and mixtures thereof. The (R) organic radical is a hydrocarbon (saturated or unsaturated) and it may have oxygen or hydroxyl group substituents or linkages but halogen, sulfur and nitrogen substituents are generally avoided. These may occur in the form of solids or fluids and are an essential ingredient in the combustible reactant.

The organic esters of the metals and metalloids are especially useful organic combustible compounds for the method of my invention. They comprise a class of simple alkoxy esters, polymers thereof, and combinations of such esters to produce alkoxy salts. Ortho esters and polymeric esters such as alkyl and aryl titanates, stannates, zirconates, phosphates, ferrates, silicates, borates, aluminates, antimonates, etc. and polymers thereof are especially useful. A number of these esters are available as commercial products, i. e. esters of Ti, Zr, Si, P, and Al. Some of these are discussed in "The Chemistry of Aliphatic Ortho-Esters," H. W. Post, A. C. S. Nonograph #92, Reinhold (1943). The alkoxy salts are represented by the methyl, ethyl, butyl, propyl, etc. esters of the alkali, alkaline earth metals together with those compounds of the true metals and metalloids. Alkoxy salts such as potassium lithium isopropylate, potassium beryllium ethylate, potassium calcium benzylate, potassium zinc methylate, potassium zinc ethylate, sodium zinc isopropylate, aluminum zinc isopropylate, zinc boron methylate, sodium boron isoamylate, potassium boron benzylate, aluminum hydroxoethylate, aluminum cyclohexanolate, aluminum dihydroxocyclohexanolate, aluminum benzylate, potassium aluminum methylate, lithium aluminum methylate, potassium aluminum ethylate, sodium aluminum ethylate, calcium alminum ethylate, magnesium aluminum ethylate, calcium aluminum ethylate, magnesium aluminum ethylate, potassium aluminum propylate, potassium aluminum isopropylate, calcium aluminum isopropylate, magnesium aluminum isopropylate, lithium aluminum isoamylate, potassium aluminum cyclohexanolate, potassium aluminum benzylate, sodium aluminum benzylate, copper aluminum ethylate, nickel aluminum ethylate, cobalt aluminum ethylate, sodium antimony methylate, sodium antimony ethylate, sodium ferric ethylate, sodium stannic ethylate, potassium stannic ethylate, per acid potassium titanium butylate, acid sodium zirconium ethylate, sodium antimony 5-ethylate, and etc., are useful ingredients.

The acylate (or organic acid-inorganic base or amphoteric oxide type of ester) compounds are operable and some of these materials are available commercially.

The "organo-metallic" or "metallo-organic" compounds, restricted to those having a metal or metalloid to carbon bond, may serve as combustible ingredients but many precautions must be observed in using these materials. Many are highly reactive and spontaneously inflammable, see Kirk and Othmer, "Encyclopedia of Chemical Technology," Interscience, N. Y., vol. 9, pp. 612–642 (1952). Their use may be limited to special operations such as in compositions wherein a self-ignitable mixture is desired because of their properties and because of economic reasons based on their usual high cost.

Safety precautions should be emphasized in handling many of the reactants and during the formation of some of the products especially lead, arsenic, antimony, tellurium and phosphorous containing materials. The organo-metallic compounds in general must be carefully handled. Personnel protection such as adequate ventilation, operation in hoods, respirator or mask protection, etc. should be carefully considered for each operation.

The choice of a particular organic group in the metal or metalloid ingredient compound is dictated usually by economic considerations, but variations in the amount of organic matter connected with the metal and metalloid elements are useful according to the amount of fuel one desires for the burning operation, for instance with high molecular weight organic compounds more carbon and hydrogen is available for oxidation per unit of the metal and metalloid. This factor allows one to vary the amount of heat produced during the burning operation.

Remaining ingredients may be selected from compatible compounds of metals or metalloids especially oxides, multi-component oxides, hydroxides, hydrides and elemental materials. Because of the desire to utilize the process for special coating operations where protecting the spraying personnel is difficult, certain salts of components are usually considered to be undesirable such as halide salts, nitrogen compounds, such as nitrates or nitrites, and sulphur compounds such as sulphides, sulphites or sulphates because of the corrosive or hazardous oxidation products obtained. It is desirable to exclude halogen elements from the ingredient composition and as a substituent in the organic compounds except for the compositions wherein the halogen remains in the solid product, for example in solid products wherein fluoride bonding between mineral crystal structures is desired. A liquid solution of various ingredients to be burned is preferable but dispersions of solids in a fluid are applicable by choice of type of burner utilized, such burner variations being well known in the combustion art. A solution comprised of liquid ingredients and solutions or dispersions of the ingredients as liquids and solids, in hydrocarbons such as mineral spirits, hexane, benzene, etc., or other organic solvents such as ketones, alcohols, etc. are equally useful. A combustible mixture of all solid ingredients may be utilized but the benefits of the initial mixing of liquid ingredients do not accrue.

I claim as my invention:

1. A process for the deposition of an inorganic ceramic oxidic composition consisting of at least two oxides onto a solid surface which comprises feeding a fluid mixture comprising compounds of elements essential to said oxidic composition, at least one of the said compounds being a combustible organic compound selected from the group consisting of

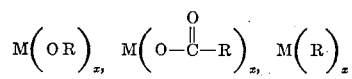

and polymers and mixtures thereof, R being a hydrocarbon radical and M being an oxide forming element essential to said oxidic composition into a flame while simultaneously feeding a stream of an oxygen containing gas into the flame, burning the compounds to maintain the flame above the melting point of the said inorganic oxidic composition and directing the resulting molten composition in the form of a spray onto said solid surface.

2. A process for the deposition of an inorganic ceramic oxidic composition consisting of at least two oxides onto a solid flame resistant surface which comprises feeding into a flame oxygen and a fluid combustible composition consisting of a combustible fuel and the inorganic elements essential for the formation of the ceramic composition, at least one of the said inorganic elements being present therein in compound form as an organic compound and having a chemical formula represented by a member of the group consisting of

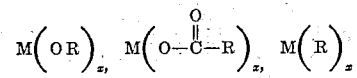

and polymers and mixtures thereof, R being a hydrocarbon radical, and M being an oxide forming element essential to said ceramic composition, burning the combustible compounds to maintain the flame temperature above the melting point of the said inorganic oxidic composition, and directing the resulting molten composition in the form of a spray onto said solid surface.

3. A process for the deposition of a vitreous coating containing a plurality of component oxides on a flame resistant surface which comprises preparing a fluid mixture of reactants comprising the elements essential to said vitreous coating, at least one of said reactants being a fluid combustible organic compound selected from the group consisting of

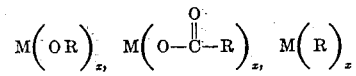

and polymers and mixtures thereof, R being a hydrocarbon radical and M being an oxide forming element essential to said oxidic composition, burning the combustible fluid mixture with oxygen during passage through a flame which is thereby maintained at a temperature above the melting point of the vitreous coating and directing the resulting molten products in the form of a spray onto the surface to be coated.

4. A process for producing a vitreous composition consisting of a plurality of inorganic oxides which comprises forming a fluid mixture of reactants consisting of a combustible fuel and the elements essential to said vitreous composition, at least one of said reactants being a fluid combustible organic compound selected from the group consisting of

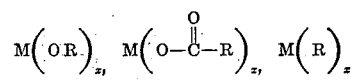

and polymers and mixtures thereof, R being a hydrocarbon radical and M being an oxide forming element essential to said vitreous composition, passing the fluid mixture and oxygen into a flame where the combustible material of the fluid mixture is burned to maintain the flame temperature above the melting point of the vitreous composition being produced and directing the resulting molten composition in the form of a spray onto a receiving surface for solidification of said vitreous composition.

5. A process for the deposition of an inorganic ceramic oxidic composition consisting of at least two oxides onto a solid surface which comprises feeding a fluid mixture comprising compounds of elements essential to said oxidic composition, at least one of said compounds being a combustible ester of an oxide forming element essential to said oxidic composition into a flame while simultaneously feeding a stream of an oxygen containing gas into the flame, burning the combustible compounds of the mixture therein to maintain the flame above the melting point of the said inorganic oxidic composition and directing the resulting molten composition in the form of a spray onto a solid receiving surface for solidification.

References Cited in the file of this patent

UNITED STATES PATENTS

| 2,068,892 | Schweitzer | Jan. 26, 1937 |
| 2,090,617 | Bley | Aug. 24, 1937 |
| 2,090,618 | Bley | Aug. 24, 1937 |
| 2,442,976 | Heany | June 8, 1948 |
| 2,689,803 | Ackerman | Sept. 21, 1954 |

FOREIGN PATENTS

| 179,216 | Great Britain | Apr. 27, 1922 |